J. NORTH.
MACHINE FOR FOLDING PAPER.
No. 38,874.  Patented June 9, 1863.
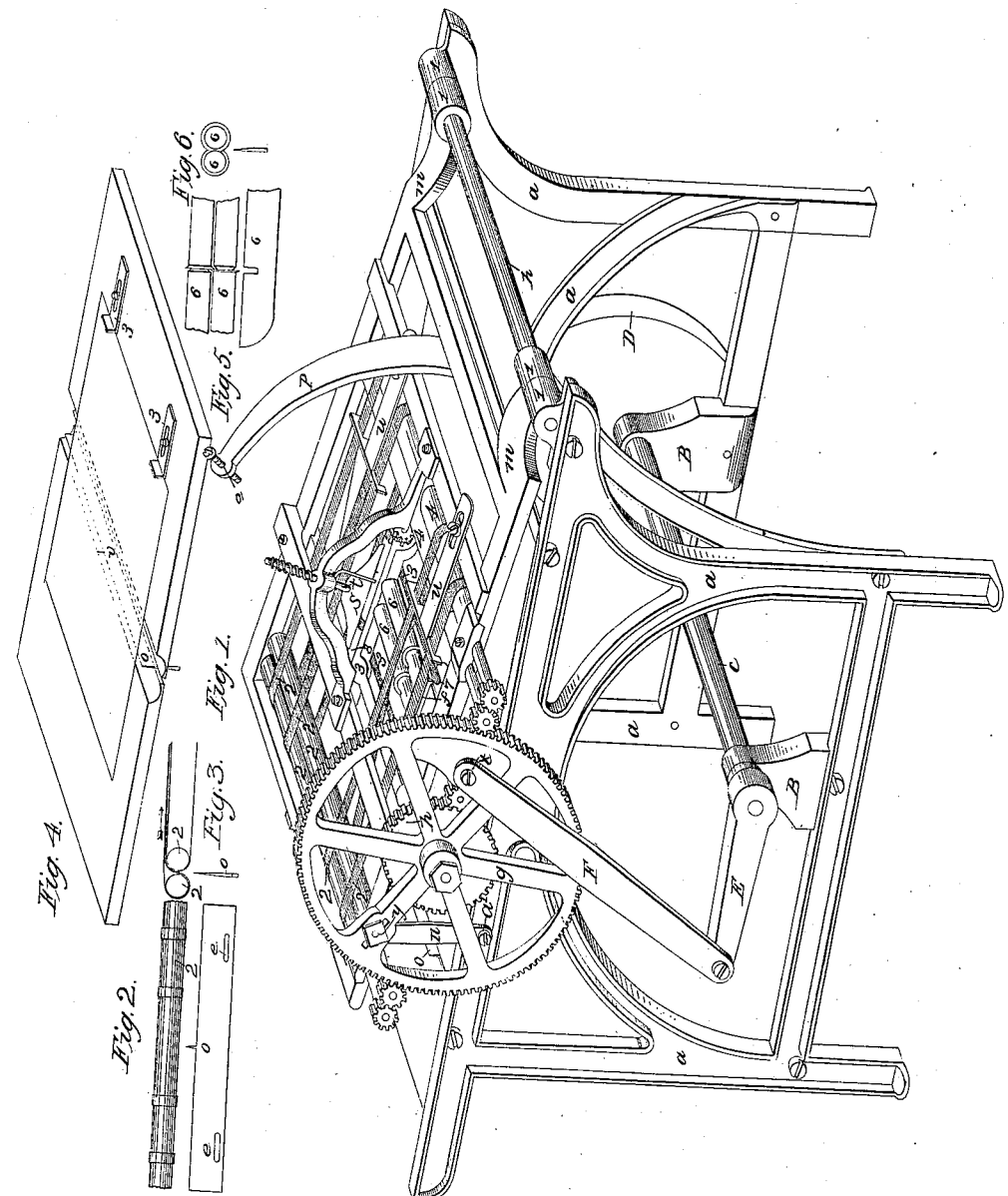

UNITED STATES PATENT OFFICE.

JOHN NORTH, OF MIDDLETOWN, CONNECTICUT, ASSIGNOR TO DANIEL S., GEORGE S., SAMUEL T., JOHN A., AND WILLIAM H. APPLETON, OF NEW YORK, N. Y.

MACHINE FOR FOLDING PAPER.

Specification forming part of Letters Patent No. 38,874, dated June 9, 1863; antedated August 10, 1858.

*To all whom it may concern:*

Be it known that I, JOHN NORTH, of Middletown, in the county of Middlesex and State of Connecticut, have invented a new and useful Machine for Folding Paper; and I do hereby declare that the following is a full and clear description thereof, referring to the accompanying drawings, in which—

Figure 1 is a perspective representation of the complete machine. Fig. 2 is a detached view of the first folding-knife, which is made adjustable at slots $e\ e$ and attached to knife is one register-point at $v$. Fig. 3 is an end view of Fig. 2. Fig. 4 is a detached view of the table with the knife attached, showing the manner of adjusting the sheet in the register to receive its first fold at stops 3. Fig. 5 is a detached view of the last folding-rollers, with the cutters attached, $i\ i$, for the purpose of cutting off the inset while it is being folded. Fig. 6 is an end view of Fig. 5.

In constructing my machine I make a suitable frame, $a\ a$, Fig. 1, to which I attach the frame $m\ m$, with the shaft $h$, at figures 1 1 1 1, at the end of frame $a\ a$. Attached to the frame $m\ m$ are rollers, figures 2 2 3 3 4 4 6 6 7 7, the rollers being geared together and made to operate in a manner to be described. Attached to the frame $m\ m$ is a large gear, $g$, with gear $h$ fastened to it, which gears into small gears on rollers 2, 4, and 6. Rollers 4 gear into rollers 3. Link $n$ is attached to large gear at $y$ and to frame $a\ a$ at $a'$, and link F attached to gear at $x$ and to crank E; and the shaft $c$, to which the crank E and pulley D are attached and hung in boxes B B, attached to frame $a\ a$, Fig. 1. On the top of the frame $m\ m$ is attached the bar R, to which is attached a folding-knife, S. Attached to the frame $a\ a$, Fig. 1, is an arm, P, extending upward, with a set-screw attached to the upper end at $e$. Under the rollers 2 2 is attached to frame $a\ a$ the first folding-knife, $o$, made adjustable Fig. 2, at $e\ e$, with one register-point attached. The sheet on being placed on the register-point is squared to gage 3, Fig. 4. The sheet now ready to be folded, motion being applied to the pulley D, the frame $m\ m$ moves down, causing the rollers to rotate in opposite directions to receive the sheet, which presses the sheet down upon the knife $o$. The frame $m\ m$, in changing its motion upward, causes the rollers to change their rotating motion, which seizes the sheet folded and is carried by the tapes or belts 2 2 2 2 under the knife S and above the rollers 3 3, and is arrested by the adjustable stop at $u\ u$. When the knife-rod $t$ strikes against the screw $e$ and forces the sheet between the rollers 3 3, the frame $m\ m$, changing to a downward motion, causing the rollers 3 3 to change their rotating motion, and seizes the sheet folded the second time, and is carried under the rollers 6 6 by tapes 3 3 to stop $f$, where it receives its third fold, the same as described by first fold, the rollers 6 6 having each of them circular cutters, attached at $i\ i$, which cut the sheet in two on being folded. The inset is placed by hand inside of the sheet folded, and is called the "12-mo" form of folding, the machine being adapted to folding the twelve or octavo form, which is done with no other machine. The frame $m\ m$ is made to reciprocate on the shaft $h$ in the arc of a circle, and causing all of the rollers to rotate alternately and change their motion at the proper time to receive the sheet to be folded, the lap or joint in the belts is placed so as not to come in contact with the sheet, which would tend to disturb the sheet while being conveyed to the stops to receive its succeeding fold. A continuous rotating motion being a great difficulty in folding-machines, the lap or joint in the belts coming in contact with the sheet tends to throw the sheet out of register.

In my experience in folding-machines the past four years, I have discovered the defects in folding paper by the different machines. In a continuous rotary motion the rollers with tapes to carry the sheet, the sheet, on being presented to the rollers the first touch where a fullness or wrinkle it is seized and carried to the stops out of register, the lap or joint in the belts making a fullness which throws the sheet out of register and making bad folding, which is a great defect in folding-machines of this character.

The folding-machine for which a patent was granted to me in 1856 to fold sheets by a stationary straight-edge or knife and folding-nip.

pers is defective. The sheet is liable to slip in nippers on taking the sheet from the knife, which makes bad register, the adjustments being complicated and makes it objectionable.

In the present machine I obviate the difficulties mentioned in the above machines, the present being more simple in its construction and more reliable in its register, and quick and easily adjusted for different-size sheets, and is adapted to folding the single twelves and single octavo forms, which is done by no other machine.

Having thus fully described my machine for folding paper, what I claim as new therein, and desire to secure by Letters Patent, is—

1. Placing the sheet direct in register upon the knife to receive its first fold, in the manner and for the purpose hereinabove described.

2. Folding paper by means of a straight-edge or knife and reciprocating rollers.

3. Hanging the frame $m$ $m$ with reciprocating rollers and folding-knife $e$ attached, to move and reciprocate in the arc of a circle.

4. Causing the rollers to rotate and change their motion alternately, for the purpose specified.

5. Cutting off the inset for the 12-mo folding at the same time it is being folded.

Dated at Middletown the 19th day of May, A. D. 1858.

JOHN NORTH.

In presence of—
JONATHAN KILBOURN,
JONATHAN BARNES.